3,079,440
HINDERED ACETYLENIC AMINES

Nelson R. Easton, Indianapolis, and George F. Hennion, South Bend, Ind., assignors to Eli Lilly and Company, Indianapolis, Ind., a corporation of Indiana
No Drawing. Filed Feb. 29, 1960, Ser. No. 11,437
6 Claims. (Cl. 260—583)

This invention relates to novel α-aminoacetylenes and to their acid addition salts.

The α-aminoacetylenes provided by this invention are:

3-t-butylamino-3-methyl-1-hexyne,
3-isopropylamino-3,4,4-trimethyl-1-pentyne,
3-t-amylamino-3-methyl-1-butyne,
3-t-butylamino-3-methyl-1-butyne,
N-methyl-N-isopropyl 3-amino-3-methyl-1-butyne,
N-methyl-N-t-butyl 3-amino-3-methyl-1-butyne, and N-ethyl-N-t-butyl 3-amino-3-methyl-1-butyne.

The nontoxic pharmaceutically-acceptable acid addition salts of the above acetylenic amine bases are also included within the scope of this invention. By nontoxic pharmaceutically-acceptable acid addition salts are meant those salts prepared from nontoxic acids which have substantially the same mammalian toxicity as the free bases from which they are prepared.

The free bases of this invention are volatile oils having a typical amine odor. The nontoxic pharmaceutically-acceptable acid addition salts of the free bases are white crystalline solids soluble in most polar solvents, including water. Among the nontoxic acids which are useful for forming the pharmaceutically-acceptable acid addition salts of this invention are both inorganic and organic acids, for example, hydrochloric acid, sulfuric acid, phosphoric acid, hydrobromic acid, maleic acid, succinic acid, cinnamic acid, tartaric acid and the like.

The free bases of this invention are prepared by the reaction of an α-chloroacetylene with a primary or secondary amine. The reaction procedure used is patterned after the procedure of Hennion and Nelson, J. Am. Chem. Soc. 79, 2142 (1957), and comprises the reaction of an α-acetylenic chloride with a primary or a secondary amine preferably in the presence of water and of a catalytic quantity of a copper salt or of copper-bronze powder. If no copper catalyst is used, the reaction between the acetylenic chloride and the amine takes considerable time, even with heating. The use of the catalyst, however, greatly shortens the reaction time and in most instances, the reaction proceeds spontaneously without external heating.

In carrying out the reaction between an α-acetylenic chloride and a primary or secondary amine, an excess of the amine is customarily employed, the excess serving to combine with the hydrogen chloride produced as a by-product in the reaction. A ratio of from 2 to 5 moles of amine per mole of acetylenic chloride is usually employed. However, if the amine is difficult to obtain, an excess of a nonreacting base can be employed in conjunction with an equimolar amount of the amine. For example, an inorganic base such as aqueous potassium hydroxide or sodium hydroxide can be used as can organic bases which do not react with the α-acetylenic halide; e.g., tertiary amines such as triethyl amine or pyridine.

An alternative method exists for the preparation of the tertiary amine free bases of this invention, which alternative method comprises the alkylation of a previously prepared secondary amine containing the acetylenic grouping. One method of carrying out this alkylation reaction comprises mixing an alkylating agent, as for example dimethyl sulfate or ethyl p-toluene sulfonate, with the secondary acetylenic amine free base in the presence of potassium carbonate. Alternatively, the secondary acetylenic amine can be alkylated with formic acid and formaldehyde to yield the desired N-methyl derivative. In either case, the tertiary acetylenic amine thus formed is isolated by procedures well known to the art and is purified by distillation.

The compounds of this invention either in the form of their free bases or as nontoxic pharmaceutically acceptable acid addition salts thereof have pronounced activity as ganglionic blocking agents. The compounds demonstrate their activity when administered by the oral route.

This invention is illustrated by the following specific examples:

EXAMPLE 1

*Preparation of 3-t-Butylamino-3-Methyl-1-Hexyne*

60 ml. of water and 121.7 g. of t-butylamine were mixed. 72.5 g. of 3-chloro-3-methyl-1-hexyne were added to the aqueous amine solution and the reaction mixture was allowed to stand at ambient room temperature for about 25 days. The reaction mixture was then poured into a solvent mixture comprised of 200 ml. of water and 200 ml. of ether. The aqueous layer was separated and discarded. The ethereal layer containing 3-t-butylamino-3-methyl-1-hexyne formed in the above reaction was washed with two 100-ml. portions of water and was dried over solid potassium hydroxide. 3-t-butylamino-3-methyl-1-hexyne was purified by distillation through a Widmer column. The compound boiled at about 50–53° C. at a pressure of about 8 mm. of mercury; $n_D^{25} = 1.439$.

*Analysis.*—Calc.: C, 78.97; H, 12.65; N, 8.37. Found: C, 79.01; H, 12.45; N, 8.15.

3-t-butylamino-3-methyl-1-hexyne hydrochloride was prepared by adding an excess of ethanol saturated with hydrogen chloride to an ethereal solution of the corresponding free base. The compound melted at about 175–176° C.

*Analysis.*—Calc.: N, 6.88. Found: N, 6.65.

EXAMPLE 2

*Preparation of 3-Isopropylamino-3,4,4-Trimethyl-1-Pentyne*

Following the procedure of Example 1, about 100 ml. of water were mixed with 180 g. of isopropylamine. 108 g. of 3-chloro-3,4,4-trimethyl-1-pentyne were added to the aqueous amine solution and the reaction mixture was allowed to stand at ambient room temperature for about one month. The reaction mixture was poured into 200 ml. of ether and 100 ml. of water. The ethereal layer containing 3-isopropylamino-3,4,4-trimethyl-1-pentyne formed in the above reaction was separated and was washed twice with 50-ml. portions of water. The washes were discarded. 200 ml. of a 10 percent aqueous hydrochloric acid solution were added and 3-isopropylamino-3,4,4-trimethyl-1-pentyne dissolved in the acidic aqueous layer as in the form of its hydrochloride salt. The ethereal layer was separated and was discarded as were two further 100-ml. ether washes. 200 ml. of a 10 percent aqueous sodium hydroxide solution were then added to the acidic aqueous layer forming 3-isopropylamino-3,4,4-trimethyl-1-pentyne free base. The free base, which was insoluble in the alkaline layer, was extracted with 200 ml. of ether. The aqueous layer was separated and was washed with two more 200-ml. portions of ether. The ether extracts were combined and were dried. The ether was removed by evaporation, and the resulting residue comprising 3-isopropylamino-3,4,4-trimethyl-1-pentyne was distilled through an adiabatic glass helix-packed column. 3-isopropylamino-3,4,4-trimethyl-1-pentyne boiled at about 110–130° C. at a pressure of about 104 mm. of mercury; $n_D^{25} = 1.445$.

3-isopropylamino-3,4,4-trimethyl-1-pentyne hydrochloride was prepared by adding an excess of ethanol saturated with hydrogen chloride to an ethereal solution of the free base. 3-isopropylamino-3,4,4-trimethyl-1-pentyne hydrochloride melted at about 198–199° C. after recrystallization from ethyl acetate.

*Analysis.*—Calc.: N, 6.88. Found: N, 6.88.

EXAMPLE 3

*Preparation of 3-t-Butylamino-3-Methyl-1-Butyne*

Following the procedure of Example 1, 700 ml. of distilled water were added to 1,533 g. of t-butylamine. 714.5 g. of 3-chloro-3-methyl-1-butyne were added to the aqueous amine solution and the reaction mixture was allowed to stand at ambient room temperature for 11 days. 3-t-butylamino-3-methyl-1-butyne formed in the above reaction was isolated by the procedure of Example 1 and was purified by distillation through a Widmer column. The compound boiled at about 72–72.5° C. at a pressure of about 84 mm. of mercury; $n_D^{25}=1.430$. The distillate crystallized upon cooling to 0° C. It melted at about 24° C.

*Analysis.*—Calc.: N, 10.06. Found: N, 10.24.

3-t-butylamino-3-methyl-1-butyne hydrochloride was prepared by dissolving 5 g. of 3-t-butylamino-3-methyl-1-butyne in 25 ml. of anhydrous ether. The solution was cooled to about 0° C. and a 10 percent excess of a saturated ethereal hydrogen chloride solution was added. 3-t-butyl amino-3-methyl-1-butyne hydrochloride precipitated and was separated by filtration. The precipitate was twice recrystallized from an ethanol-ethyl acetate solvent mixture. 3-t-butylamino-3-methyl-1-butyne hydrochloride thus purified melted at about 221–223° C.

*Analysis.*—Calc.: C, 61.52; H, 10.33; N, 7.97. Found: C, 61.27; H, 10.00; N, 8.16.

EXAMPLE 4

*Preparation of 3-t-Amylamino-3-Methyl-1-Butyne*

Following the procedure of Example 1, 100 ml. of water were mixed with 261 g. of t-amylamine. 102.5 g. of 3-chloro-3-methyl-1-butyne were added and the reaction mixture was allowed to stand at ambient room temperature for about 28 days. The reaction mixture was then refluxed for about 24 hours to bring the reaction more nearly to completion. 3-t-amylamino-3-methyl-1-butyne thus formed was isolated by the procedure of Example 1, and was purified by distillation through a Widmer column. 3-t-amylamino-3-methyl-1-butyne boiled at about 51° C. at a pressure of 6 mm. of mercury;

$$n_D^{25}=1.437$$

*Analysis.*—Calc.: C, 78.36; H, 12.50; N, 9.14. Found: C, 78.11; H, 12.52; N, 9.06.

3-t-amylamino-3-methyl-1-butyne hydrochloride was prepared by adding an excess of ethanol saturated with hydrogen chloride to an ether solution of the free base. After isolation and purification the compound melted at about 167–169° C.

*Analysis.*—Calc.: N, 7.38. Found: N, 7.17.

EXAMPLE 5

*Prepartion of N-Methyl-N-Isopropyl 3-Amino-3-Methyl-1-Butyne*

70.8 g. of N-methyl isopropylamine, 40 ml. of water and 0.5 g. of copper-bronze powder were mixed and 41 g. of 3-chloro-3-methyl-1-butyne were added dropwise to the mixture. After the addition of the chloroacetylene had been completed, the reaction mixture was heated at about 40° C. for about 18 hours. The reaction mixture was cooled and was poured into a mixture of water and ether. The ethereal layer containing N-methyl-N-isopropyl 3-amino-3-methyl-1-butyne formed in the above reaction was separated and was contacted with 250 ml. of a 20 percent aqueous hydrochloric acid solution. The ethereal layer was discarded. The acidic aqueous layer containing the hydrochloride salt of N-methyl-N-isopropyl 3-amino-3-methyl-1-butyne was made basic to litmus by the addition of 50 percent sodium hydroxide. N-methyl-N-isopropyl 3-amino-3-methyl-1-butyne free base was insoluble in the alkaline layer and was extracted with chloroform. The chloroform layer was separated and was dried. The chloroform was removed by distillation and the N-methyl-N-isopropyl 3-amino-3-methyl-1-butyne which remained as a residue, was purified by distillation in vacuo. It boiled at about 96–98° C. at a pressure of about 135 mm. of mercury; $n_D^{25}=1.435$.

Following the procedure of Example 1, the hydrochloride salt of N-methyl-N-isopropyl 3-amino-3-methyl-1-butyne was prepared. It melted at about 184–186° C. after recrystallization from a mixture of ethyl acetate and isopropanol.

*Analysis.*—Calc.: N, 7.98. Found: N, 8.13.

EXAMPLE 6

*Preparation of N-Methyl-N-t-Butyl 3-Amino-3-Methyl-1-Butyne*

33 g. of 3-t-butylamino-3-methyl-1-butyne hydrochloride were dissolved in water, and the aqueous solution was made basic to litmus with 40 percent sodium hydroxide. 3-t-butylamino-3-methyl-1-butyne was insoluble in the alkaline layer, and was extracted with 200 ml. of ether. The ethereal layer was separated and was dried and the ether was removed by evaporation at atmospheric pressure. The residue, comprising 3-t-butylamino-3-methyl-1-butyne free base, was mixed with 40 g. of dimethyl sulfate and 10 g. of potassium carbonate. The reaction mixture was gradually heated with stirring to a temperature of about 95° C. During the heating period, about 20 g. more of potassium carbonate were added in small batches. The reaction mixture was cooled to about 40° C. and 100 ml. of water and 200 ml. of ether were added. The ethereal layer containing N-methyl-N-t-butyl 3-amino-3-methyl-1-butyne formed in the above reaction, was separated and was shaken with 200 ml. of 10 percent hydrochloric acid, thus forming the hydrochloride salt of N-methyl-N-t-butyl 3-amino-3-methyl-1-butyne. The salt dissolved in the aqueous layer; the ethereal layer was separated and discarded. The acidic aqueous layer was made basic with 40 percent sodium hydroxide, thus forming N-methyl-N-t-butyl 3-amino-3-methyl-1-butyne free base. The free base which was insoluble in the alkaline layer was extracted with 100 ml. of ether. The ethereal layer was separated, was dried and the ether was removed by evaporation at atmospheric pressure, leaving a residue comprising N-methyl-N-t-butyl 3-amino-3-methyl-1-butyne. The residue was distilled yielding purified N-methyl-N-t-butyl 3-amino-3-methyl-1-butyne boiling in the range 115–116° C. at a pressure of about 130 mm. of mercury; $n_D^{25}=1.450$.

N-methyl-N-t-butyl 3-amino-3-methyl-1-butyne was converted to the corresponding hydrochloride salt by dissolving the free base in ether and saturating the ethereal layer with anhydrous hydrogen chloride gas. N-methyl-N-t-butyl 3-amino-3-methyl-1-butyne hydrochloride was insoluble in ether and precipitated. The precipitate was separated by filtration and was recrystallized from a mixture of isopropanol and methyl ethyl ketone. N-methyl-N-t-butyl 3-amino-3-methyl-1-butyne hydrochloride thus prepared, melted at about 140–142° C.

*Analysis.*—Calc.: N, 7.38. Found: N, 7.35.

N-ethyl-N-t-butyl 3-amino-3-methyl-1-butyne was prepared by the above procedure except that diethyl sulfate was used in place of dimethyl sulfate. N-ethyl-N-t-butyl 3-amino-3-methyl-1-butyne boiled in the range 110–120° C. at a pressure of about 130 mm. of mercury; $n_D^{25}=1.444$. The hydrochloride salt of N-ethyl-N-t-butyl 3-amino-3-methyl-1-butyne was prepared according to the procedure of Example 1. The hydrochloric salt decomposed at about 135° C. It was recrystallized from an ethanol-ether solvent mixture.

*Analysis.*—Calc.: C, 64.8; H, 10.9; N, 6.88. Found: C, 64.07; H, 10.83; N, 7.00.

EXAMPLE 7

Preparation of Salts

Nontoxic pharmaceutically-acceptable acid addition salts of α-acetylenic amines can be prepared by dissolving the free base in a solvent and adding thereto a solution containing an equivalent amount of nontoxic acid. If ether is used as a solvent, the acid salt of the amine is usually insoluble therein and can be isolated by filtration. If, on the other hand, a solvent such as ethanol is used in which the amine salt is usually soluble, the salt is isolated by evaporation of the solvent. As is well known in the art, salts of acids which can be obtained in gaseous form such as hydrogen chloride can also be prepared by bubbling the gaseous acid into a solution of the amine. The resulting salt is, as before, isolated according to whether it is soluble or insoluble in the solvent employed.

The α-chloroacetylenes used as starting materials for the preparation of the acetylenic amines of this invention are prepared from the corresponding α-hydroxyacetylenes. A suitable procedure for the preparation of chloroacetylenes from hydroxyacetylenes is that of Hennion and Maloney, J. Am. Chem. Soc. 73, 4735 (1951), and this method has been used with modifications to prepare α-chloroacetylene starting materials useful for preparing the compounds of this invention. The following preparation of 3-chloro-3-methyl-1-butyne illustrates the modified procedure used to prepare α-chloroacetylene starting materials.

EXAMPLE 8

Preparation of 3-Chloro-3-Methyl-1-Butyne 167 g. of calcium chloride and 2 g. of copper-bronze powder were mixed in a one-liter round-bottomed flask. 168 g. of 3-methyl-1-butyne-3-ol were added and the resulting mixture was cooled to about 10° C. About 600 ml. of 12 N hydrochloric acid cooled to 0° C., were added in three 200-ml. portions with slight shaking. The reaction mixture was maintained at about 10–15° C. for about 15 minutes and was then allowed to warm up slowly to ambient room temperature. After a total reaction time of about one hour, the lower acidic aqueous layer was separated and was discarded. The organic layer was washed twice with 200-ml. portions of distilled water followed by a 100-ml. portion of a 10 percent sodium bicarbonate solution. The washes were all discarded. The organic layer was then steam distilled until about 90 percent of the organic layer had distilled. The aqueous portion of the distillate was separated and discarded. The organic layer containing 3-chloro-3-methyl-1-butyne formed in the above reaction was dried over solid potassium carbonate and was then distilled through an electrically heated 60 cm. fractionating column. The fraction distilling in the range 72–77° C. at atmospheric pressure was collected. Redistillation of this fraction through the same column gave 105 g. of purified 3-chloro-3-methyl-1-butyne boiling in the range 74–76° C. at atmospheric pressure; $n_D^{25}=1.416$.

Table I which follows lists other α-chloroacetylenes prepared by following the above procedure. In addition, the table lists the hydroxyacetylene used as the starting material as well as the boiling point and refractive index of the chloroacetylene prepared therefrom.

TABLE I

| Starting material | Final product | Boiling range | Refractive index ($n_D^{25}$) |
|---|---|---|---|
| 3-methyl-1-hexyn-3-ol. | 3-chloro-3-methyl-1-hexyne. | 54–55° C. at 45 mm. of Hg. | 1.435 |
| 3,4,4-trimethyl-1-pentyn-3-ol. | 3-chloro-3,4,4-trimethyl-1-pentyne. | 82° C. at 94 mm. of Hg. | |

The preparation of novel α-hydroxyacetylenes useful in the preparation of two of the above chloroacetylenes is more fully illustrated below.

EXAMPLE 9

Preparation of 3-Isopropyl-4-Methyl-1-Pentyn-3-ol 46 g. of sodium in the form of small chunks were added with stirring to about 3 l. of liquid ammonia. During the addition, acetylene gas was also passed into the liquid ammonia. After all the sodium had been added and the bluish color of sodium metal had disappeared, 228 g. of diisopropyl ketone were added to the solution. The addition of the acetylene was maintained during the addition of the ketone and for about 4 hours thereafter. 1,000 ml. of ether were added and the reaction mixture was allowed to stand overnight during which time the liquid ammonia evaporated. 1,000 ml. of water were added and the ether layer which contained the 3-isopropyl-4-methyl-1-pentyn-3-ol formed in the above reaction, was separated and was dried. The ether was removed by evaporation in vacuo in the cold. Distillation of the resulting residue yielded purified 3-isopropyl-4-methyl-1-pentyn-3-ol boiling in the range 80–83° C. at a pressure of about 28 mm. of mercury; $n_D^{25}=1.442$.

Table II which follows its new hydroxyacetylenes prepared by the above procedure as well as the known ketones from which they were prepared. In addition, Table II gives the boiling points and refractive indexes of the hydroxyacetylenes.

TABLE II

| Starting ketone | Final product | Boiling range | Refractive index ($n_D^{25}$) |
|---|---|---|---|
| methyl t-butyl ketone. | 3,4,4-trimethyl-1-pentyn-3-ol. | 88–90° C. at 100 mm. of Hg. | 1.438 |

We claim:

1. A member of the group consisting of the free bases 3-t-butylamino-3-methyl-1-hexyne, 3-isopropylamino-3,4,4-trimethyl-1-pentyne, 3-t-amylamino-3-methyl-1-butyne, 3-t-butylamino-3-methyl-1-butyne, N-methyl-N-isopropyl 3-amino-3-methyl-1-butyne, N-methyl-N-t-butyl-3-amino-3-methyl-1-butyne, and N-ethyl-N-t-butyl 3-amino-3-methyl-1-butyne and the salts of the free bases formed with nontoxic pharmacetutically acceptable acids.
2. 3-isopropylamino-3,4,4-trimethyl-1-pentyne.
3. 3-t-amylamino-3-methyl-1-butyne.
4. 3-t-butylamino-3-methyl-1-butyne.
5. N-methyl-N-t-butyl 3-amino-3-methyl-1-butyne.
6. N-ethyl-N-t-butyl 3-amino-3-methyl-1-butyne.

References Cited in the file of this patent

UNITED STATES PATENTS 2,273,141    Reppe et al.    Feb. 17, 1942
2,613,208    Van Hook et al.    Oct. 7, 1952